United States Patent [19]
Kroos

[11] Patent Number: 4,603,032
[45] Date of Patent: Jul. 29, 1986

[54] APPARATUS FOR PROCESSING SHEET-LIKE LAYERS BY MEANS OF A SPARK DISCHARGE

[76] Inventor: Liselotte Kroos, Ahornweg 10, 8135 Söcking, Fed. Rep. of Germany

[21] Appl. No.: 654,159

[22] Filed: Sep. 25, 1984

[30] Foreign Application Priority Data

Sep. 27, 1983 [DE] Fed. Rep. of Germany ... 8327709[U]

[51] Int. Cl.⁴ .................... B01J 19/08; B01J 19/12
[52] U.S. Cl. .................... 422/186.21; 204/164; 422/186.23; 422/186.26
[58] Field of Search .................... 204/164; 427/32, 37; 422/186.26, 186.23, 186.18, 186.21

[56] References Cited

U.S. PATENT DOCUMENTS 2,881,470 4/1959 Berthold .................... 204/168
4,153,560 5/1979 Dinter .................... 422/186.18

Primary Examiner—John F. Niebling
Attorney, Agent, or Firm—Anthony A. O'Brien

[57] ABSTRACT

Apparatus for processing a web of material by spark discharge includes a housing enclosing a roller electrode and an opposed electrode, the opposed electrode being mounted on a cover and the roller electrode being mounted in a drawer which is normally closed by the cover and which is movable out of the housing on rails in the longitudinal direction of the web. A second pair of electrodes may be provided, the roller electrode of the second pair being mounted on the cover and the opposed electrode being mounted in the drawer.

4 Claims, 3 Drawing Figures

APPARATUS FOR PROCESSING SHEET-LIKE LAYERS BY MEANS OF A SPARK DISCHARGE

BACKGROUND OF THE INVENTION

The invention relates to an apparatus accommodated in a housing or box, for processing sheet-like layers in the form of webs which are passed through the apparatus, by means of spark discharge between an electrode in the form of a roller and an opposed electrode arranged axially parallel thereto, one electrode being carried by a lid of the box.

An apparatus of this type is known from German Utility Model No. 7328009. Its function is to protect from contact, and in it the lid is joined to the box by a hinge, so that the lid can be raised into an inclined position to enable a web to be inserted. This arrangement has been found to have the drawback that a space is required above the box to enable it to be opened by raising the lid, and such a space is not always available.

SUMMARY OF THE INVENTION

The purpose of the invention is to construct the box so that the space required to open it is virtually insignificant. According to the invention this is done by having the other electrode mounted in a drawer, which is covered by the lid and carried by rails and which can be moved out of the box below the lid in the longitudinal direction of the webs.

With this construction of the box the lid is an immovable component thereof. The box is opened by moving out the drawer, and since the drawer is slid in the longitudinal direction of the webs, the drawer can be moved out of the box into a region which the webs will pass through in any case, so that the space required to move the drawer out is automatically available. There is the further advantage that no gravitational force has to be overcome in the shifting movement of the drawer when this movement is horizontal, and a horizontal movement can be taken as a basis for normal cases.

The box advantageously contains rollers, each with an opposed electrode, for processing on both sides, one roller being carried by the lid and the other by the drawer, and the two rollers being offset from one another in the direction in which the drawer is slid. With this arrangement the webs extend inside the box in the manner of an S-bend and stretch partly round a roller in each case. If this stretching round effect, resulting from appropriate feed and discharge of the webs, is chosen so that there is sufficiently oblique guidance at the inlet and outlet side, then the tension exerted by a web exerts a force on the drawer which pulls the drawer back into the box.

To allow for displacement of the drawer subject only to slight frictional forces, the rails are preferably in the form of telescopic guides.

At least one directional changing roller may be mounted on the box, in order to obtain the most favourable angle in each case for advancing and guiding away the webs.

BRIEF DESCRIPTION OF THE DRAWINGS

An example of the invention is illustrated in the accompanying drawings, in which:

FIG. 1 is a section through the apparatus, seen from the side with the drawer pushed in.

DETAILED DESCRIPTION OF THE PREFERRED EMBODIMENT

Figure 1:
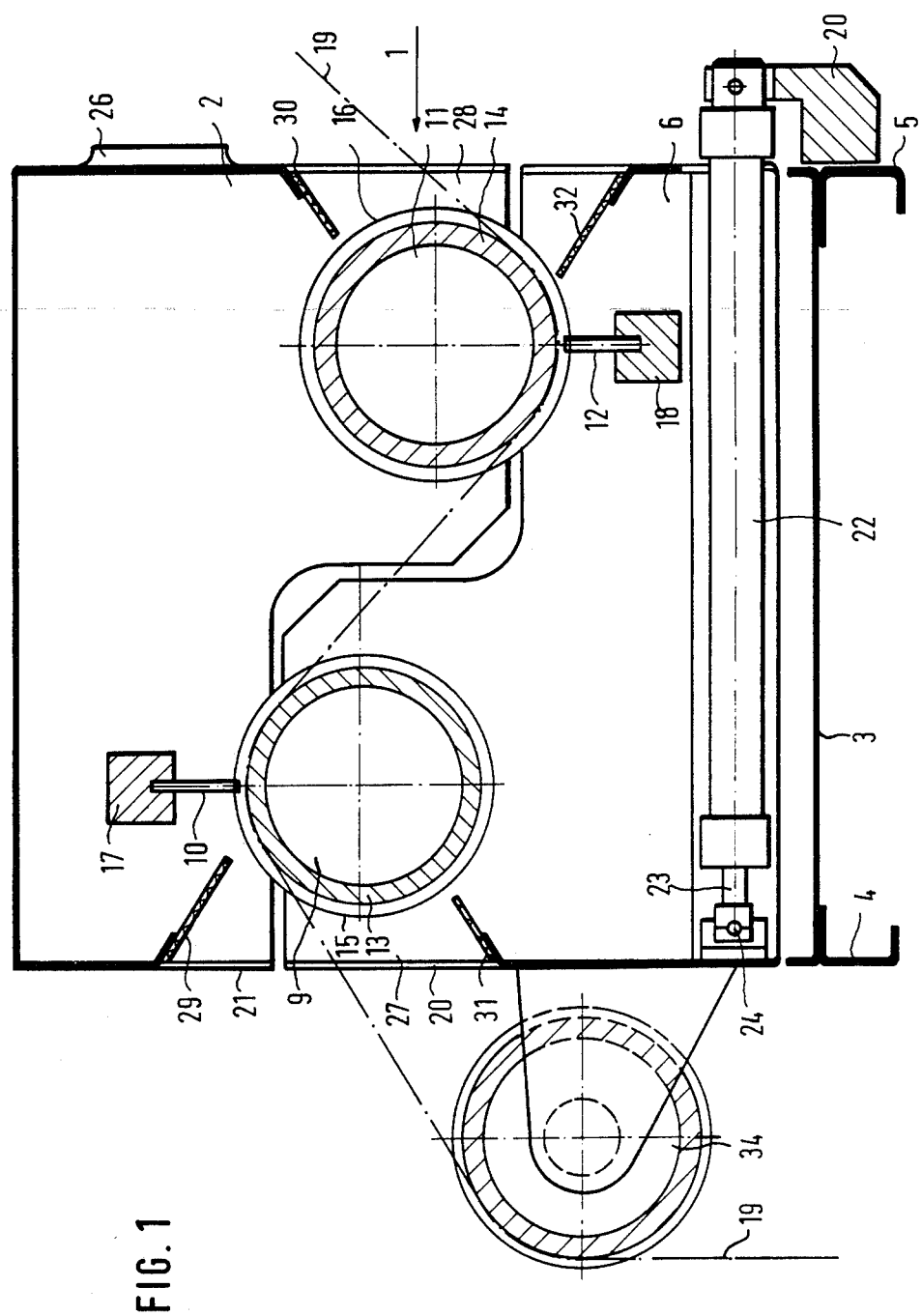

The apparatus shown in FIG. 1 comprises a space discharge apparatus for processing the surface of a web or elongated continuous sheet material, which apparatus includes a housing or box 1 with a lid 2 and base 3. Over the base 3 the box 1 is fixed to a framework made up of the two U-shaped rails 4 and 5. The box 1 contains the drawer 6, which can be moved in and out of the box 1 by means of the telescopic rails 7 and 8 shown in FIG. 3 (for pulled out position see FIG. 2).

Referring to FIG. 1, the box 1 contains two pairs of electrodes, namely one pair consisting of the roller electrode 9 and the blade electrode 10 acting as the opposed electrode, and another pair consisting of the roller electrode 11 and the opposed electrode 12 in blade form. The electrodes are connected to a high voltage source any well known manner including a spark discharge between the electrodes 9 and 10 and the electrodes 11 and 12. The rollers 9 and 11 each have an insulating jacket 13 and 14 respectively. They are also each provided at their opposite ends with restricting discs 15 and 16 respectively, which prevent the webs being processed from moving out laterally. The blade electrodes 10 and 12 are fixed to the lid 2 and drawer 6 respectively by means of insulating brackets 17 and 18.

As shown in FIG. 1, a web 19 made of plastics sheeting and drawn as a dash and dot line follows a substantially S-shaped course in box 1. It is processed from one side when there is spark discharge between the electrodes 9 and 10 and from the other side when there is spark discharge between the electrodes 11 and 12. The spark discharge apparatus illustrated thus allows for processing from both sides. However, it should be pointed out that if only unilateral processing is desired the FIG. 1 apparatus may be restricted to the provision of one pair of electrodes, e.g. the roller 9 and blade electrode 10.

In the apparatus illustrated, the roller 9 and blade electrode 12 are fixed to the drawer 6 while the blade electrode 10 and roller 11 are arranged on the lid 2. When the drawer 6 is pulled out of the box 1, the roller 9 and blade electrode 12 consequently move out (see FIG. 2), thereby making enough space for a web to be threaded through easily.

Figure 2:
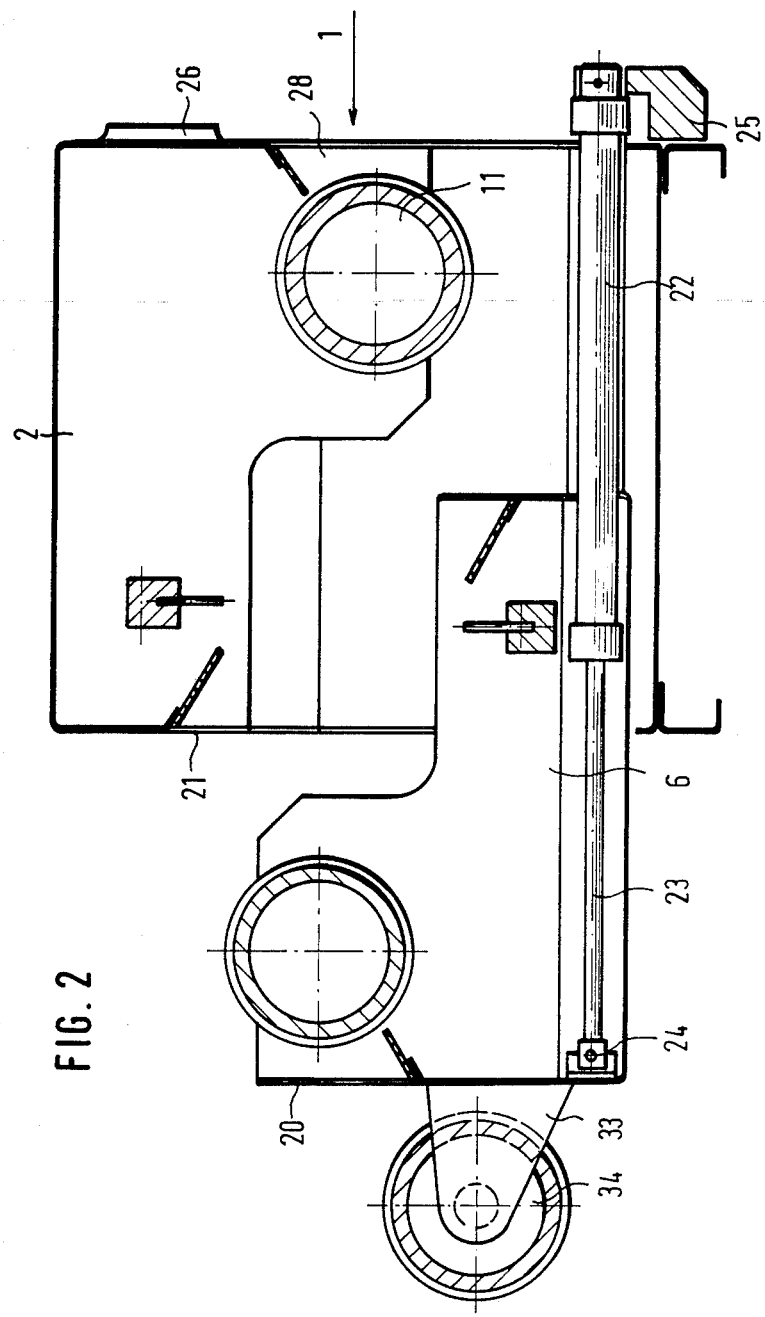
FIG. 2 shows the same apparatus in the same position with the drawer moved out.

As already mentioned, the pulled out position of the drawer 6 is illustrated in FIG. 2. It will be seen that the front plate 20 of the drawer 6 projects from the box 1, that is to say, the front plate 20 is appropriately offset from the front plate 21 of the box 1. When a web 19 has been threaded in, the drawer 6 is then pushed back to the normal position shown in FIG. 1, in which the web 19 is in the S-shaped formation resulting from the offsetting of the two rollers 9 and 11 as they are moved toward each other in a direction substantially parallel to the direction in which the drawer 6 slides.

Figure 3:
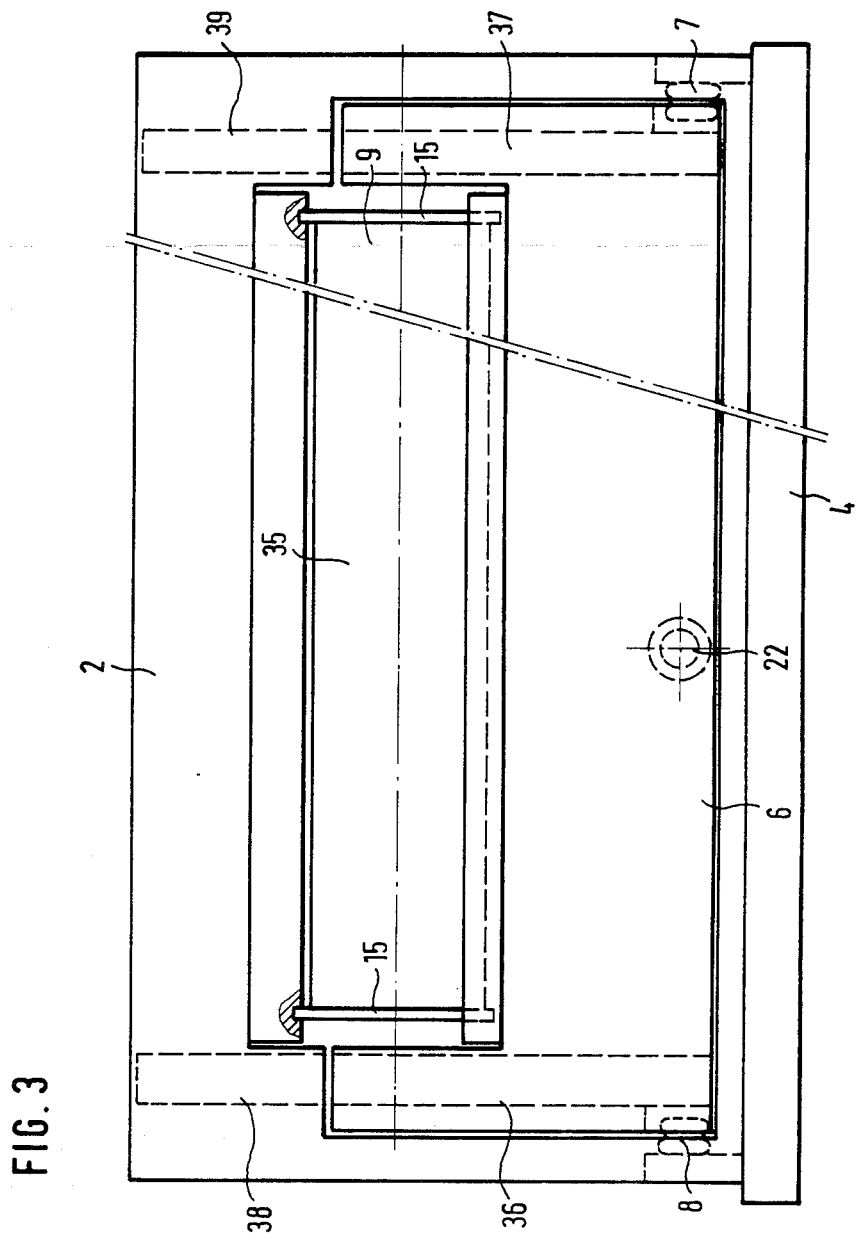
FIG. 3 shows the FIG. 1 arrangement turned through 90°, looking at the front of the drawer, and without the direction changing roller shown in FIGS. 1 and 2.

As previously stated, the telescopic guides 7 and 8 shown in FIG. 3 are responsible for the largely low friction to and fro movement of the drawer 6; the guides are known components which are available with ball guides. The to and fro movement of the drawer 6 is here brought about by the hydraulically or pneumatically operated piston cylinder unit 22; activation of the unit 22 moves out the ram 23, to which the drawer 6 is fixed by the pin 24. The piston cylinder unit 22 is fixed to the U-rail by the angle 25.

Since toxic gases may sometimes develop when sheets of plastics are being processed by spark discharge, the apparatus is provided with a suction or exhaust connection 26 mounted on the lid 2. A suction means (not shown) is coupled to it in a known manner. The suction connection 26 sucks air into the interior of the box 1 via the inlet 27 and outlet 28. To prevent excessively large gaps from forming in the region of the inlet 27 and outlet 28, the lid 2 is provided with covers 29 and 30 and the drawer with covers 31 and 32. These project inwardly from the appropriate walls of the lid 2 and drawer 6 towards the appropriate roller 9 and 11 respectively and leave a relatively small gap between themselves and that roller. The covers 29, 30 and 31, 32 are made of plastics, but with a grounded electrode, such covers may be made of metal, since the box 1 is grounded in any case. If the suction connection 26 in the lid 2 is insufficient for complete suction because the web 19 partitions the interior of the box 1, a corresponding suction connection has to be provided in the base 3.

As shown in FIGS. 1 and 2, a direction changing roll 34 is mounted on the drawer 6 by means of supporting arms 33. Its function is to allow the web 19 inserted in the apparatus to pass through the inlet 27 unimpeded. Another reason for providing the roll 24 is to keep the looping round angle of the roller electrode 9 constant. In addition the roll 34 keeps a web 19 guided over it away from the drawer 6, even when the drawer has been pulled out, so that the web cannot be damaged by any edges on the drawer 6. At the outlet 28 side there is normally always a constant looping round angle for the roller electrode 11, since a reel for winding on the finished material is usually arranged at that side.

As shown graphically in FIG. 2, the space requirement for opening the box 1 extends in a direction from which a web 19 to be processed is normally fed into the apparatus, so the necessary space is automatically available here.

FIG. 3 shows the FIG. 1 apparatus with the direction changing roll 34 omitted. The roller 9 can be seen here with the two restricting discs 15, and the method of suspending the roller 9 in the drawer is indicated by the dash and dot centre line 35 symbolising a spindle. The roller electrode 9 is mounted laterally in the two supporting walls 36 and 37 which are fixed to the drawer 6. The lid 2 also has corresponding supporting walls, namely the walls 38 and 39, which are fixed to it and which mount the roller electrode 11 (not visible in FIG. 3). The position of the piston cylinder unit 22, responsible for moving the drawer 6 to and fro, is also shown in FIG. 3.

It should be pointed out that the sheet-like layers to be processed, in web form, need not necessarily be sheets of plastics; they could be of other material e.g. plastic coated metal foil. Metal foil or metallized sheets of plastic may equally be treated, in which case the metal foil or metallized sheet of course has to be passed over a metal roller electrode with a plastic coated electrode arranged opposite it. It should finally be mentioned that roller electrodes may be used instead of the blade electrodes shown in the drawings.

What is claimed is:

1. Spark discharge apparatus for processing the surface of an elongated continuous sheet material moving through the apparatus, the combination comprising:
    a housing having an inlet and an outlet adapted to enclose said sheet material moving in a given path therethrough;
    a first roller electrode and a cooperating opposed electrode, arranged axially parallel to said roller electrode, both mounted within said housing and positioned on opposite sides of said path of said sheet material and adapted to process one side thereof;
    a drawer slidably mounted to be moved longitudinally into and out of said housing adjacent said inlet of said housing;
    a second roller electrode and a cooperating opposed electrode, arranged axially parallel to said roller electrode, both mounted within said drawer and positioned on opposite sides of said path and adapted to process the second side of said sheet material
    said sheet material movable through said inlet, and first passing intermediate said second roller electrode and its cooperating opposed electrode and then passing intermediate said first roller electrode and its cooperating opposed electrode before exiting from said outlet of said housing;
    whereby selective actuation of the first and second roller electrodes and their opposed electrodes will process the respective sides of said moving sheet material.

2. The apparatus as claimed in claim 1 wherein said inlet and said outlet lie in and define a plane within said housing, said second roller electrode having its axis of rotation disposed above said plane and said first roller electrode having its axis of rotation disposed below said plane whereby said moving sheet is partially wrapped about the peripheral surface of said roller electrodes as said sheet passes by the respective opposed electrodes.

3. The apparatus as claimed in claim 2 wherein the plane defined by said inlet and said outlet of said housing lies substantially parallel to the direction of movement of said drawer.

4. The apparatus as claimed in claims 1, 2 and 3 wherein said drawer is slidably mounted on telescopic rails for ease of movement into and out of said housing.

* * * * *